R. S. PEIRCE.
ANCHOR BOLT.
APPLICATION FILED DEC. 9, 1912.

1,201,496.

Patented Oct. 17, 1916.

Witnesses:

Inventor:
Ralph S. Peirce.

UNITED STATES PATENT OFFICE.

RALPH S. PEIRCE, OF HINSDALE, ILLINOIS.

ANCHOR-BOLT.

1,201,496.  Specification of Letters Patent.  Patented Oct. 17, 1916.

Application filed December 9, 1912. Serial No. 735,644.

*To all whom it may concern:*

Be it known that I, RALPH S. PEIRCE, citizen of the United States, residing at Hinsdale, in the county of Dupage and State of Illinois, have invented a certain new and useful Improvement in Anchor-Bolts, of which the following is a full, clear, concise, and exact description, reference being had to the accompanying drawings, forming a part of this specification.

My invention relates to anchoring devices and has for its object the provision of a simplified and very effective device of this character.

Generally speaking the anchoring device of my invention includes an integral element of non-resilient flexible material having a plurality of superposed portions and receivable within a bore and expansible transversely of such bore, in combination with a bolt held by said integral element when said element is expanded within the receiving bore.

My invention as embodied in its preferred form constitutes an anchoring device that includes a coiled wire whose coils are spaced apart, a soft coiled wire whose coils intervene between the coils of the other wire, which is relatively hard, whereby the coils of soft wire are mashed outwardly when the coils of the harder wire are brought closer together, in combination with a bolt received within the bores of the coils.

The soft metal preferably expands inwardly toward the bolt and outwardly toward the wall of the bore that receives the device, though the invention is not to be limited to the expansion of the soft metal in both directions.

I will explain my invention more fully by reference to the accompanying drawing showing the preferred embodiment thereof and in which—

Figure 1:
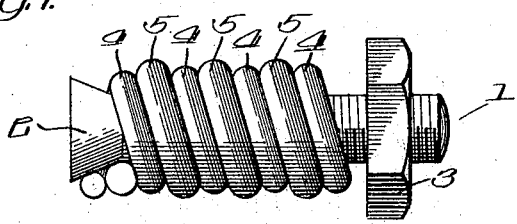
Figure 2:
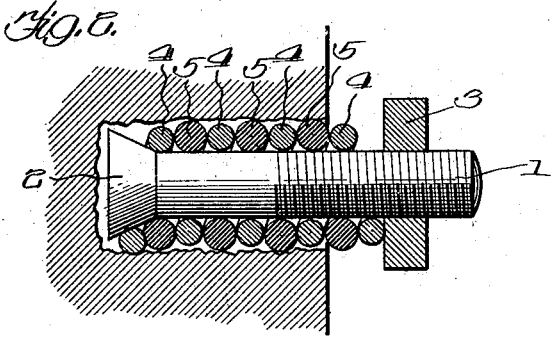
Figure 3:
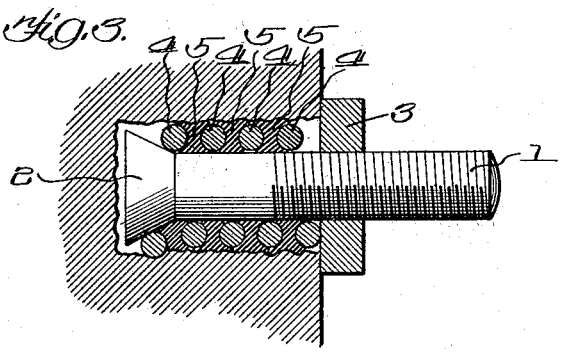

Figure 1 is a side view of the device before it is operated upon to secure its location within a receiving bore; Fig. 2 is a view of the structure shown in Fig. 1 before it is operated upon and located within a receiving bore, the coils and clamping nut which surround the bolt being shown in section; Fig. 3 is a view similar to Fig. 2 excepting that the coils of soft metal wire have been operated upon by the coils of harder wire to expand the coils of soft wire for the purpose of holding the bolt within the receiving bore.

Like parts are indicated by similar characters of reference throughout the different figures.

The supporting element is preferably in the form of a bolt 1 which, constituting one form of support which is to be mounted in position, is shown as being provided with a fixed head 2 and an adjustable head or nut 3, the nut 3 working upon the threaded portion of the bolt shank. I do not wish to be limited, however, to a bolt that is provided with a head nor to a bolt which is threaded and has a nut working upon the threaded portion. A non-resilient flexible wire 4 (which may be made of soft iron or soft steel) is initially coiled as illustrated in Figs. 1 and 2 and a non-resilient soft wire 5 (which may be of lead for example) is also initially coiled as illustrated in Figs. 1 and 2, the coils of the soft wire 5 intervening between the coils of the harder wire 4 whereby when the coils of the harder wire are brought closer together the coils of the soft wire are mashed outwardly to be brought into forcible engagement with the receiving bore, as illustrated in Fig. 3, whereby the bolt 1 which is received within the bore of the wire coils is firmly held in position. The element 5 is thus a collapsible element in that when it is compressed it is inherently capable of remaining in the shape to which it is altered.

Any suitable means may be employed for bringing the coils of hard wire closer together in order to mash the coils of soft wire for the purpose stated. In the embodiment of the invention illustrated the means employed, to which the invention is not to be limited, resides in the nut 3, which may be forcibly turned toward the head 2 of the bolt for the purpose. The coils 4 of hard wire constitute portions of an integral element of non-resilient flexible material, which portions are superposed or spaced apart, and the coils 5 of soft wire constitute portions of an integral element of soft non-resilient, flexible material, which latter portions are also superposed or spaced apart, and while, in the preferred embodiment of the invention, the portions 5 are soft and the portions 4 are relatively hard and non-resilient, I do not wish to be limited to such characteristics in all embodiments of the invention, nor do I wish to be limited to the precise details of construction and relative arrangement shown as changes may readily be made without departing from the spirit of my invention as set forth in the claims annexed.

It will be observed that the rear coil of the element 4 acts as a stop to obstruct the rearward flow of the soft material to prevent or limit the exudation of the soft metal rearwardly so that the gripping action of the soft metal may not be materially impared but will be increased. It will be observed that the stronger the outward pull upon the bolt the more effective will be the action upon the stop during the expanding action of the bolt head 2 thereupon, as illustrated in Fig. 3. This stop, being the last coil or so of the element 4, is shown as being made in one piece but I do not wish to be limited to this characteristic.

Having thus described my invention I claim as new and desire to secure by Letters Patent the following:—

1. An anchoring device including a coiled wire whose coils are spaced apart and are hard, a soft coiled wire whose coils intervene between the coils of the other wire, which is relatively hard, whereby the coils of soft wire are mashed outwardly when the coils of the harder wire are brought closer together, in combination with a bolt received within the bores of the coils.

2. An anchoring device including a coiled soft wire, the coils of which are spaced apart, and a plurality of portions of relatively hard material interposed between the aforesaid coils and operating upon the coils when these portions are brought closer together to mash the coils outwardly when within a receiving bore, in combination with a bolt receivable within the bore of the coiled wire.

3. An anchoring device including a coiled wire, the coils of which are spaced apart, and a plurality of portions of soft material interposed between the aforesaid coils and operated upon by the coils, which are relatively hard, when these coils are brought together to be mashed and outwardly thrust when within a receiving bore, in combination with a bolt receivable within the bore of the coiled wire.

4. An anchoring device including an integral element having a plurality of superposed spaced apart portions, and an integral element of soft wire having a plurality of superposed spaced apart portions and operated upon by the first aforesaid portions, which are relatively hard, when these first aforesaid portions are brought closer together whereby the second aforesaid portions are mashed outwardly, in combination with a bolt adapted to be held within a bore by the first aforesaid portions when spread outwardly.

5. An anchoring device including an integral element of soft material having a plurality of superposed spaced apart portions, and a plurality of portions of relatively hard wire interposed between the aforesaid portions and operating upon the first aforesaid portions when the second aforesaid portions are brought closer together to spread the first aforesaid portions outwardly, in combination with a bolt adapted to be held within a bore by the first aforesaid portions when spread outwardly.

6. An anchoring device including an integral element having a plurality of superposed spaced apart portions, and a plurality of portions of soft material interposed between the aforesaid portions and operated upon by the first aforesaid portions, which are relatively hard, when these first aforesaid portions are brought closer together to be mashed and outwardly thrust when within a receiving bore, in combination with a bolt held within such bore by the second aforesaid portions when expanded and means for bringing said portions into gripping engagement with the bolt and the wall of the bore receiving the bolt firmly to anchor the bolt in the bore.

7. An anchoring device including a plurality of superposed spaced apart portions which are adapted to be brought closer together to reduce the spacing therebetween and other portions, which are soft to enable them to be mashed, interposed between the aforesaid portions and operated upon by the first aforesaid portions when these first aforesaid portions are brought closer together to be outwardly thrust when within a receiving bore; in combination with a supporting element held within such bore with the aid of the second aforesaid portions when outwardly thrust and means for bringing said portions into gripping engagement with the supporting element and the wall of the bore receiving the supporting element firmly to anchor the supporting element in the bore.

8. An anchoring device including an integral element having a plurality of superposed spaced apart portions which are adapted to be brought closer together to reduce the spacing therebetween and other portions, which are flexible and non-resilient, interposed between the aforesaid portions and operated upon by the first aforesaid portions when these first aforesaid portions are brought closer together to be outwardly thrust when within a receiving bore; in combination with a supporting element held within such bore with the aid of the second aforesaid portions when outwardly thrust and means for bringing said portions into gripping engagement with the supporting element and the wall of the bore receiving the supporting element firmly to anchor the supporting element in the bore.

9. An anchoring device including an integral element of non-resilient flexible material having a plurality of superposed portions and receivable within a bore and expansible transversely of such bore, in combination with a bolt held by said integral element when said element is expanded within the receiving bore and means for bringing said portions into gripping engagement with the bolt and the wall of the bore receiving the bolt firmly to anchor the bolt in the bore.

10. An anchoring device including an integral collapsible element having a plurality of superposed portions and receivable within a bore and expansible transversely of such bore and means for expanding said element, in combination with a bolt held by said integral element when said element is expanded within the receiving bore; and means for causing said portions to interact to effect gripping engagement between said portions, the bolt and the wall of the bore receiving the bolt firmly to anchor the bolt in the bore.

11. An anchoring device including an integral element having a plurality of spirally continuous superposed portions of non-resilient flexible material and receivable within a bore and expansible transversely of such bore and means for expanding said element, in combination with a bolt held by said integral element when said element is expanded within the receiving bore, and means for causing said portions to interact to effect gripping engagement with the bolt and the wall of the bore receiving the bolt firmly to anchor the bolt in the bore.

12. An anchoring element including soft material, in combination with a bolt, a stop at the inner end of the bolt for obstructing the rearward flow of the soft material, and means for expanding the stop and the soft material to effect and maintain gripping engagement between the wall of the bore receiving the bolt, the bolt, and said soft material.

In witness whereof, I hereunto subscribe my name this fifth day of December, A. D., 1912.

RALPH S. PEIRCE.

Witnesses:
E. L. WHITE,
G. L. CRAGG.